United States Patent [19]
Bogdanov et al.

[11] 3,831,418
[45] Aug. 27, 1974

[54] EXTRUSION DIE ASSEMBLY

[76] Inventors: Evdokim Stepanovich Bogdanov, Volzhsky prospekt 45, kv. 90, Kuibyshev; Alexandr Sergeevich Alexandrov, Vyazemskaya ulitsa, 6, kv. 51, Moscow; Vadim Dmitrievich Schegolevatykh, Sadovaya ulitsa, 172, kv. 3, Kuibyshev; Vyacheslav Ivancvich Saveliev, Spartakovskaya ulitsa, 16, kv. 7, Moscow; Mikhail Fedorovich Zakharov, ulitsa Tolbukhina, 12, kv. 84, Moscow; Jury Nikolaevich Alexandrov, 3 Prudny pereulok, 11/13, kv. 93 "A", Moscow; Gennady Mikhailovich Korsetsky, Tashkentsky pereulok, 3, kv. 2; Arnold Arkadievich Kucher, Prospekt Metallurgov, 71, kv. 85, both of Kuibyshev, all of U.S.S.R.

[22] Filed: May 15, 1973

[21] Appl. No.: 360,551

Related U.S. Application Data
[63] Continuation of Ser. No. 205,649, Feb. 7, 1971, abandoned.

[30] Foreign Application Priority Data
May 29, 1968 U.S.S.R............................ 1252825

[52] U.S. Cl.................... 72/273, 72/478, 72/482
[51] Int. Cl. ........................................... B21c 25/00
[58] Field of Search............ 72/273, 478, 481, 482; 425/381

[56] References Cited
UNITED STATES PATENTS
2,925,176  2/1960  Wyorgaert.......................... 72/273

*Primary Examiner*—Charles W. Lanham
*Assistant Examiner*—Robert M. Rogers
*Attorney, Agent, or Firm*—Holman & Stern

[57] ABSTRACT

A die assembly for extrusion molding of profile shapes is rigidly mounted on the press ram and includes two coaxially arranged parts. The first part is a holder having the free cylindrical end portion provided with an external thread of which the axial extent is limited by a radial shoulder. The other part is a cylindrical nut threaded onto the free end portion of the holder, so that an axial gap is left between the face end of the nut and the radial shoulder of the holder, with this gap being intended to be taken up in the course of an extrusion mold operation, whereby the die assembly provides for a variation of the external diameter thereof, and the cylindrical shape of the external periphery of the die assembly being unaffected by this variation of the diameter.

3 Claims, 6 Drawing Figures

EXTRUSION DIE ASSEMBLY

This is a continuation, of application Ser. No. 205,649, filed Dec. 7, 1971, now abandoned.

BACKGROUND OF THE INVENTION

The present invention relates to extrusion molding techniques, and, more particularly to extrusion die or disc assemblies for the extrusion molding of profile shapes from readily deformable alloys.

A die assembly constructed in accordance with the present invention can be used to utmost advantage in the process of making profile shapes by extrusion molding of aluminium and its alloys.

PRIOR ART

There is known in the prior art an extrusion die or disc assembly for the extrusion molding of profile shapes, which is made up of two parts. One of these two parts is rigidly secured on the associated press ram and has an increased diameter of the free end thereof. There is a cavity with a cylindrical wall made in the free end of this part with this wall being of a conical shape adjacent to the portion of the free end having the increased diameter. The other part of this die assembly is of a shape complementary to the internal shape of the cavity in the first part, and the other part is mounted in the first part coaxially therewith. The two parts are secured together with a bolt extending along the geometrical axis of the extrusion molding effort. The two parts are so arranged relative to each other that there is a gap left between the adjacent end surfaces thereof, with this gap being intended to be taken up in the course of a molding operation (see, for example, the USSR Author's Certificate No 170,905, Cl. 7 b, 10/80).

A disadvantage of the above specified known die assembly is the fact the portions theportions thereof where the cylindrical surface merges with the planar surface are apt to have concentrated stresses developed therein in the course of an extrusion molding operation, and this concentration of stresses substantially reduces the permissible working load of the die assembly.

Besides, the above specified known die assembly has proved to be relatively difficult to manufacture and not sufficiently convenient in operation.

It is an object of the present invention to step up the permissible working load of a die assembly.

It is another object of the present invention to prolong the operational life of a die assembly.

It is still another object of the present invention to reduce the manufacturing costs of a die assembly.

It is yet another object of the present invention to provide a die assembly of a structure which facilitates the handling of the die assembly in operation.

SUMMARY OF THE INVENTION

With these and other objects in view, the present invention resides in a die assembly for the extrusion molding of profile shapes from readily deformable alloys, comprising two coaxially arranged and rigidly jointed parts, with a gap being left intermediate of the respective adjacent faces of said parts, such gap being intended to be taken up in the course of an extrusion molding operation by relative displacement of one of said parts relative to the other of said parts, whereby said die assembly provides for variation of the external diameter thereof during both forward and reverse strokes of the associated press ram, on account of the resilient deformation of said two parts, in which die assembly, in accordance with the present invention, the internal one of said two parts is a holder having one end thereof secured to said press ram, said holder having the second free end of a substantially cylindrical shape, with the external one of said two parts being a nut of a substantially cylindrical shape, the nut being received upon said cylindrical free end of said holder and secured thereto by a detachable connection, so that said nut is adapted to be resiliently deformed under the action of the molding pressure and to maintain the cylindrical shape of the external periphery thereof throughout such deformation.

It is advisable that said detachable connection includes an external thread of said holder, of which the axial extent is limited by a radial shoulder, and an internal thread of said nut.

Alternatively, it is advisable that said detachable connection includes external lock slots of said holder, of which the axial extent is also limited by a shoulder, and complementary internal lock slots of said nut.

A die assembly for extrusion molding of profile shapes, constructed in accordance with the invention, as compared with the previously described prior art die assembly, makes it possible to increase the permissible working load thereupon by 10 to 12 per cent and to increase the service life thereof approximately twice.

Moreover, the present die assembly is simple to manufacture and convenient in operation.

Given below is a detailed description of two embodiments of the present invention, with reference being had to the accompanying set of drawings, wherein:

DETAILED DESCRIPTION OF THE INVENTION

Referring now in particular to the appended drawings, the extrusion die assembly is made up of two coaxially arranged parts.

Figure 1:
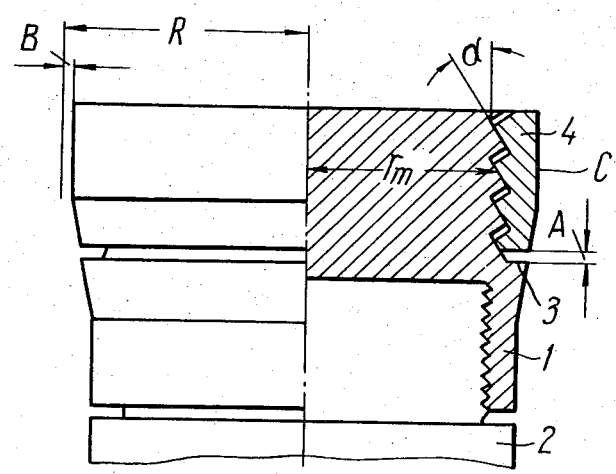
FIG. 1 is an axially sectional view of a die assembly for molding profile shapes, constructed in accordance with the present invention and including a threaded connection of the holder and the nut.

The first one of these two parts is a holder 1 (FIG. 1) having an internally threaded first end, by means of which the holder 1 is threadedly secured to a press ram 2. The other free end of the holder 1 has a cylindrical shape and is threaded externally, with the external thread ending with a radial shoulder 3.

The other part of the die assembly is a cylindrical nut member 4 with an internal thread. By means of this internal thread, the nut member 4 is threadedly secured on the externally threaded free end of the holder 1, there being an axial gap A left between the respective end face of the nut member 4 and the radial shoulder 3 of the holder 1. The gap is intended to be taken up under the load of an extrusion molding operation. The axial extent of the gap $A$ is determined by the formula:

$$A = B \operatorname{ctg} \alpha \qquad (I)$$

where $\alpha$ is the slope angle of the thread of the nut 4, this angle being preferably within a 30° to 60° range;

and $B$ is the permissible radial displacement of the internal point of the nut 4, with this radial displacement approximating the permissible radial displacement of the internal surface of the associated press container (not shown), which latter displacement can be determined from the formula: $1 + \mu/E \, q \cdot R$, (II)

where $\mu$ is Poisson's ratio;
$E$ is Young's modulus;
$q$ is permissible pressure within the press container;
$R$ is the internal radius of the press container.

The value of the radial displacement of the internal point of the nut 4, that is the value $B$ (see above), can be determined from the following expression:

$$B = \epsilon \cdot r_1 \qquad (III)$$

where $\epsilon$ is the circumferential deformation;
$r$ is the radius of any point of the thread of the nut 4.

The circumferential deformation can be determined in accordance with Hook's law:

$$\epsilon = 1/E \, (\delta_t - \mu \delta_r - \delta_z), \qquad (IV)$$

where $E$ is Young's modulus;
$\delta_t$ is the tangential stress;
$\delta_z$ is the axial stress;
$\delta_r$ is the radial stress.

The value of $\delta_t - \mu \delta_r - \delta_z$ being a calculation one and being not below the value of the permissible stress $\delta$, the, finally:

$$B = r_m/E \, \delta, \qquad (V)$$

where $B$ is the permissible radial displacement of the internal point of the nut 4;

$r_m$ is the mean radius of the thread of the nut 4 of the herein disclosed die assembly.

In the case of steel of various grades the following expression being true:

$$\delta \geq 1.3 \, q, \qquad (VI)$$

where $q$ is the permissible pressure within the press container sleeve, then $$A = (1.3 \cdot r_m \cdot q \cdot \operatorname{ctg} \alpha)/E \qquad (VII)$$

Figure 2:
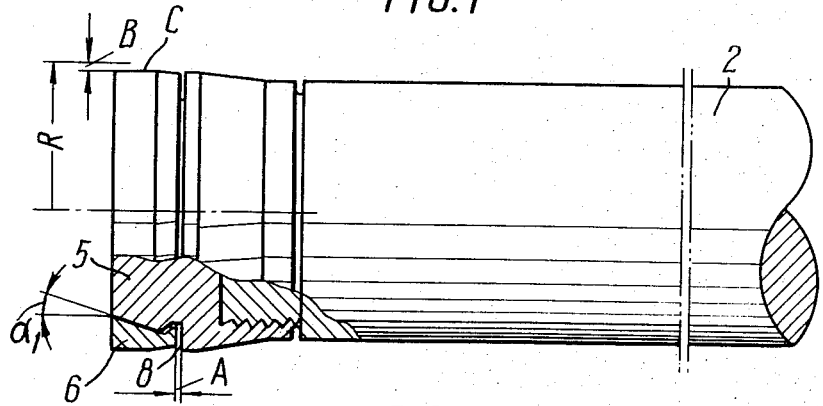
FIG. 2 illustrates in side elevation and partly broken away a die assembly, constructed in accordance with the present invention and including a lock slot connection of the holder and the nut.
Figure 3:
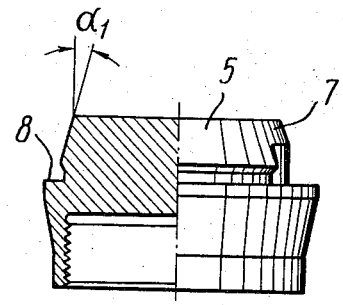
FIG. 3 is a partly axially sectional view of the holder with lock slots.
Figure 4:
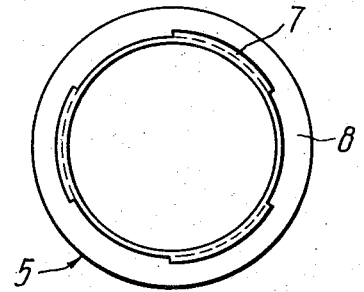
FIG. 4 is a plan view of the holder shown in FIG. 3.

Alternatively, in accordance with another embodiment of the present invention, the holder 5 (FIG. 2) can be connected with the nut 6 by means of lock slots 7. The lock slots 7 in the holder 5 are shown in more detail in FIGS. 3 and 4.

The axial extent of a lock slots 7 is limited by the radial shoulder 8 of a holder 5. The slope angle $\alpha$ or the lock slots 7 is determined in the way similar to that already described hereinabove in connection with a slope angle $\alpha$ of the threaded connection of a holder 1 and the nut 4.

Figure 6:
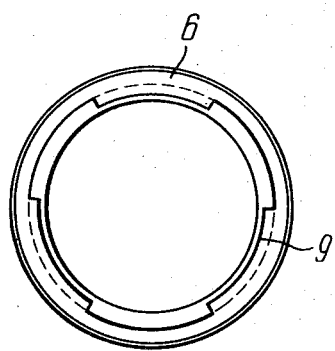
FIG. 6 is a plan view of the nut shown in FIG. 5.
Figure 5:
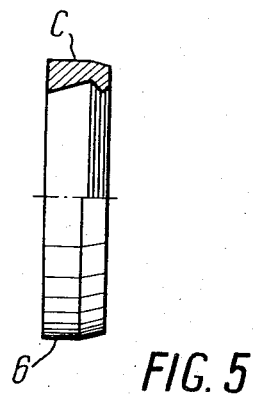
FIG. 5 is a partly axially sectional view of the nut with lock slots.

The lock slots 9 of the nut 6 and its working surface $C$ is shown in FIGS. 5 and 6.

The calculation of the gap $A$ (FIG. 2) between the adjacent end faces of the nut 6 and the holder 5 is performed similarly to the above calculation of the gap $A$ between the holder 1 and the nut 4 connected by a threaded joint, in accordance with the formula (VII). It should be noted here that a die assembly constructed in accordance with the last-described embodiment of the invention, i.e., having the lock slot joint between the holder 5 and the nut 6 has proved to be simpler in operation than the die assembly with the threaded joint.

OPERATION

A die assembly for the extrusion molding of profile shapes from readily deformable alloys, constructed in accordance with the present invention, operates, as follows:

As the press ram 2 is driven through its working stroke, the metal compressed in the press container (not shown) exerts pressure upon the exposed end faces of the holder 1 and nut 4. Under the action of this pressure, the nut 4 is displaced rearwardly, until the rear end face thereof contacts the radial shoulder 3 of the holder 1. This means that the gap $A$ is completely taken up, i.e., reduced to zero, and the working periphery $C$ of the nut 4 has its radius increased by the value of the gap $B$, this meaning resilient deformation of the nut body, and the cylindrical shape of the periphery of the nut being maintained.

When the press ram 2 is driven through a reverse stroke, the resilience of the nut 4 and of the thread of the holder 1, together with friction forces appearing at the periphery $C$ of the nut 4 return the nut 4 into the initial position thereof relative to the holder 1.

A die assembly constructed in accordance with the second abovedescribed embodiment of the present invention, i.e., having the lock slot joint, operates in the same manner, as that described hereinabove.

A die assembly for the extrusion molding of profile shapes from readily deformable alloys, constructed in accordance with the present invention, makes it possible to carry out a continuous extrusion molding operation. Moreover, as compared with similar die assemblies of the prior art, the manufacturing cost of the new die assembly is reduced 1.5 to 2.0 times, whereas the service life thereof is increased by 1.5 to 2.0 times. Furthermore, the simplicity of the structure of the die assembly has made it possible to cut the die replacement life 10 to 12 times.

What we claim is:

1. A die assembly for the extrusion molding of profile shapes from readily deformable alloys and adapted to be mounted on a press ram, comprising: a holder having a first end for attachment on said press ram and having a second free end of a cylindrical shape, said second free end being provided with external securing means, a radial shoulder on said holder limiting the axial extent of said external securing means; a part of a cylindrical shape, said part being provided with an internal complemental securing means which coacts with the securing means of the holder whereby said part is secured on said holder, there being left, intermediate of said shoulder of said holder and an adjacent end face of said part, a gap intended to be taken up in the course of a molding operation, by said part being displaced relative to said holder, whereby said die assembly provides for variation of the external diameter thereof in the course of both forward and return strokes of said die assembly in operation, due to resilient deformation of said part of said holder, with the cylindrical shape of the external periphery of said die assembly being maintained throughout said variation of said external diameter.

2. A die assembly for the extrusion molding of profile shapes from readily deformable alloys and adapted to be mounted on a press ram, comprising: a holder having a first end for attachment on said press ram and having a second free end of a cylindrical shape, said second free end being provided with external lock slots, a radial shoulder of said holder limiting the axial extent of said lock slots; a nut of a cylindrical shape, said nut being provided with internal lock slots by means of which said nut is connected with said holder, there being left, intermediate of said shoulder of said holder and an adjacent end face of said nut, a gap intended to be taken up in the course of a molding operation, by said nut being displaced relative to said holder, whereby said die assembly provides for variation of the external diameter thereof in the course of both forward and return strokes of said die assembly in operation, due to resilient deformation of said nut and of said holder, with the cylindrical shape of the external periphery of said die assembly being maintained throughout said variation of said external diameter.

3. The die assembly as claimed in claim 1, in which the external securing means of said holder is a thread and a nut constitutes said part, with the internal securing means of said nut being a thread.

* * * * *